US007083691B2

United States Patent
Hamulski et al.

(10) Patent No.: US 7,083,691 B2
(45) Date of Patent: *Aug. 1, 2006

(54) METHOD FOR PRODUCING AN ELASTIC, AIR-PERMEABLE LAMINATE FILM

(75) Inventors: Markus Hamulski, Gronau-Epe (DE); Georg Baldauf, Laer (DE); Marcus Schönbeck, Versmold (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 182 days.

This patent is subject to a terminal disclaimer.

(21) Appl. No.: 10/348,272

(22) Filed: Jan. 21, 2003

(65) Prior Publication Data

US 2003/0136497 A1  Jul. 24, 2003

(30) Foreign Application Priority Data

Jan. 23, 2002  (DE)  .................................. 102 02 333

(51) Int. Cl.
    *B32B 37/15* (2006.01)
(52) U.S. Cl. .................... 156/73.1; 156/244.11; 156/290; 156/291; 156/300; 156/302; 156/324; 156/229
(58) Field of Classification Search ............. 156/73.1, 156/244.11, 290–292, 297, 299–302, 324, 156/229, 500; 428/195.1, 198, 201, 137; 604/385.24, 385.25, 385.26, 385.27
See application file for complete search history.

(56) References Cited

U.S. PATENT DOCUMENTS

| 4,726,976 | A | * | 2/1988 | Karami et al. ............. 428/137 |
| 5,208,098 | A | * | 5/1993 | Stover ....................... 442/398 |
| 5,344,691 | A |   | 9/1994 | Hanschen et al. |
| 5,376,430 | A |   | 12/1994 | Swenson et al. |
| 5,422,172 | A | * | 6/1995 | Wu .............................. 442/62 |
| 5,514,470 | A | * | 5/1996 | Haffner et al. .............. 428/343 |
| 5,527,302 | A | * | 6/1996 | Endres et al. .......... 604/385.21 |
| 5,554,246 | A |   | 9/1996 | Anwyll, Jr. |
| 5,683,787 | A |   | 11/1997 | Boich et al. |
| 5,769,993 | A |   | 6/1998 | Baldauf |
| 5,789,065 | A |   | 8/1998 | Haffner et al. |
| 5,851,935 | A |   | 12/1998 | Srinivasan et al. |
| 6,037,281 | A | * | 3/2000 | Mathis et al. ............... 442/394 |
| 6,057,024 | A |   | 5/2000 | Mleziva et al. |
| 6,255,236 | B1 |   | 7/2001 | Cree et al. |

(Continued)

FOREIGN PATENT DOCUMENTS

DE  42 38 541  5/1994

(Continued)

*Primary Examiner*—Jessica Rossi
(74) *Attorney, Agent, or Firm*—Collard & Roe, P.C.

(57) ABSTRACT

A method for the production of an elastic, air-permeable laminate film is disclosed, whereby material webs made of a fiber non-woven fabric are applied to both sides of an elastomer layer, and the multi-layered material subsequently runs through an ultrasound bonding station. The elastomer layer is melted to form point-shaped bonds at discrete locations by means of ultrasound, while maintaining the substance of the fiber non-woven fabric. An air-permeable structure is formed at the melted sites. According to the method, a melt film made of a thermoplastic elastomer is passed to a laminating unit and introduced, in the thermoplasticized state, between two material webs of fiber non-woven fabric that run into the laminating unit. The melted intermediate layer of the multi-layered material is cooled to solidification temperature, whereby a laminate with cover layers made of fiber non-woven fabric is produced. The laminate is subsequently passed to the ultrasound bonding station.

11 Claims, 2 Drawing Sheets

U.S. PATENT DOCUMENTS

| | | | |
|---|---|---|---|
| 6,506,695 B1 * | 1/2003 | Gardner et al. | 442/76 |
| 6,537,930 B1 * | 3/2003 | Middlesworth et al. | 442/39 |
| 6,677,258 B1 * | 1/2004 | Carroll et al. | 442/394 |
| 6,818,083 B1 * | 11/2004 | McAmish et al. | 156/73.1 |
| 2001/0041484 A1 | 11/2001 | Schwinn | |
| 2002/0086602 A1 * | 7/2002 | Friderich et al. | 442/366 |

FOREIGN PATENT DOCUMENTS

| | | | |
|---|---|---|---|
| DE | 42 43 012 | | 6/1994 |
| DE | 199 83 884 | | 7/2000 |
| EP | 0 703 068 | | 3/1996 |
| GB | 1 389 201 | | 4/1975 |
| JP | 09-117982 | | 5/1997 |
| WO | WO94/14607 | | 7/1994 |
| WO | WO98/16380 | | 4/1998 |
| WO | WO 00/38918 | * | 7/2000 |
| WO | WO00/38918 | | 7/2000 |
| WO | WO01/54900 | | 8/2001 |

* cited by examiner

METHOD FOR PRODUCING AN ELASTIC, AIR-PERMEABLE LAMINATE FILM

BACKGROUND OF THE INVENTION

CROSS REFERENCE TO RELATED APPLICATIONS

Applicants claim priority under 35 U.S.C. §119 of German Application No. 102 02 333.6 filed Jan. 23, 2002.

1. Field of the Invention

The present invention relates to a method for producing an elastic, air-permeable laminate film. The film has an elastomer intermediate layer and outside layers made of non-woven fibrous fabric or material on both sides. This laminate film is used, for example, as an elastic closure cuff in the fabrication of diaper panties. It must be elastic and, to a great extent, leak-proof. To improve the wearing comfort, it possesses a textile surface and is air-permeable.

2. The Prior Art

In a method known from DE 42 38 541 A1, material webs consisting of fiber non-woven fabric are applied on both sides to a pre-finished and stretched elastomer carrier film, and connected with the carrier film in point form, by means of ultrasound bonding. At the bonding sites, the carrier film is melted through, whereby the outside non-woven fabric webs are connected with one another and bonded into the partially melted material of the carrier film. In this process, air-permeable regions are formed, which are covered by a fine lattice structure obtained from the non-woven fabric filaments. In order to produce a sufficiently strong bond between the layers, a large number of point bonds uniformly distributed over the material web is required. This distribution also establishes the distribution of the air-permeable sites. In the known method, there is no possibility of establishing the arrangement of the air-permeable regions with reference to the use of the laminated film. For example, it is not possible to concentrate the arrangement of the air-permeable regions on certain segments of the laminated film. Also, the laminate strength of the known laminate film still needs to be improved.

In a method for the production of an elastic laminate film known from WO 01/54900 A1, a melt film made of thermoplastic elastomer is passed to a lamination unit and introduced in the thermoplasticized state between two material webs of fiber non-woven fabric. The melted intermediate layer of the multi-layered material is cooled to solidification temperature to produce a laminate with cover layers consisting of fiber non-woven fabric. The material is not air-permeable.

From U.S. Pat. No. 5,554,246, it is known to perforate a laminate after its production, and thereby to make it air-permeable. Punching tools in the form of thorn-shaped rollers are used for perforation. The punching tools penetrate the laminate material mechanically.

SUMMARY OF THE INVENTION

The object of the invention is to provide a method for the production of an elastic, air-permeable laminate film in which a material with a high laminate strength can be produced and in which the air-permeable regions can be established with reference to the use of the film. In this connection, the number of process steps should be as small as possible, so that the laminate film can be produced in a cost-effective manner.

In accordance with the invention, a method is provided for the production of an elastic, air-permeable laminate film that has an elastomer intermediate layer and outside layers made of fiber non-woven fabric on both sides. In the method, a melt film made of thermoplastic elastomer is passed to a laminating unit and introduced, in the thermoplasticized state, between two material webs of fiber non-woven fabric that run into the laminating unit. The melted intermediate layer of the multi-layered material is cooled to solidification temperature and thereby a laminate with cover layers consisting of fiber non-woven fabric is produced. The laminate is subsequently passed to an ultrasound bonding station. There, the elastomer intermediate layer is melted to form point-shaped bonds at discrete locations by means of ultrasound, while maintaining the substance of the fiber non-woven fabric. In this way, air-permeable structures are formed at the melted sites.

Preferably, cooling of the melted intermediate layer takes place at a cooled steel roller in a roller nip of the laminating unit delimited by two rollers. In the ultrasound bonding unit that follows the laminating unit, the elastomer layer is melted at discrete locations by means of point-shaped bonds, so that the cover layers maintain their fiber-form structures. This results in air-permeable regions that are covered by a fine fiber structure of the outer layers. During partial melting of the elastomer layer that has been cooled and solidified in the laminating unit, the fibers of the thermoplasticized material are bonded into the thermoplasticized material of the elastomer layer. This additional fixing in place of the non-woven fabric reinforces the material bond that already exists.

Preferably, in the ultrasound bonding station, the laminate is passed over a bonding roller with bonding spikes or thorns that project from the circumference. In this way, ultrasound vibrations are generated at the contact surfaces between the bonding thorns and the laminate. The ultrasound tool may be structured in the form of two rollers. One roller has a smooth circumferential surface and forms a counter-bearing for the bonding process. The other roller is structured as a bonding roller with bonding spikes or thorns that project from the circumference and represents the mating electrode or sonotrode of the tool.

In another embodiment, the melt film made of an elastomer material is passed to the laminating unit in parallel strips spaced at a distance from one another, and introduced between the material webs made of fiber non-woven fabric. In this process, the material webs made of fiber non-woven fabric are glued to one another in the regions between the melt film strips. The adhesive is applied, in strips, to at least one of the two material webs before the material webs run into the laminating unit. Adhesives that can be used are, for example, hot-melt glues that can be sprayed onto the material web. The spray nozzles can be arranged close to the cooled steel roller of the laminating unit. After passing through the laminating unit, the material laminate web passes through the ultrasound station. There, permeable structures are produced in the elastic segments of the laminate material, in the manner already described.

In a further aspect, a multi-layered melt film is produced by means of co-extrusion, and introduced, in the thermoplasticized state, between the material webs of fiber non-woven fabric that run into the laminating unit, whereby at least one layer of the melt film is made of a thermoplastic elastomer. The material of the layers that come into contact with the fiber non-woven fabric can be established and optimized according to additional aspects. This results in advantages, for example improved control of the laminate adhesion between the elastic core of the film and the outside fiber non-woven fabric. Furthermore, the resistance of the laminate film to ambient influences and against substances such as skin protection agents can be improved by means of suitably establishing the material. The use of a multi-layered melt film produced by means of co-extrusion is possible with all the embodiments of the method according to the invention as described above.

The laminate produced according to the invention can subsequently be stretched in the lengthwise direction and/or crosswise to the take-off direction, or subjected to incremental stretching. As a result of the subsequent treatment, the laminate film is given greater elasticity in the stretched regions.

BRIEF DESCRIPTION OF THE DRAWINGS

Other objects and features of the present invention will become apparent from the following detailed description considered in connection with the accompanying drawings, it should be understood, however, that the drawings are designed for the purpose of illustration only and not as a definition of the limits of the invention.

In the drawings.

DETAILED DESCRIPTION OF PREFERRED EMBODIMENTS

Figure 1:
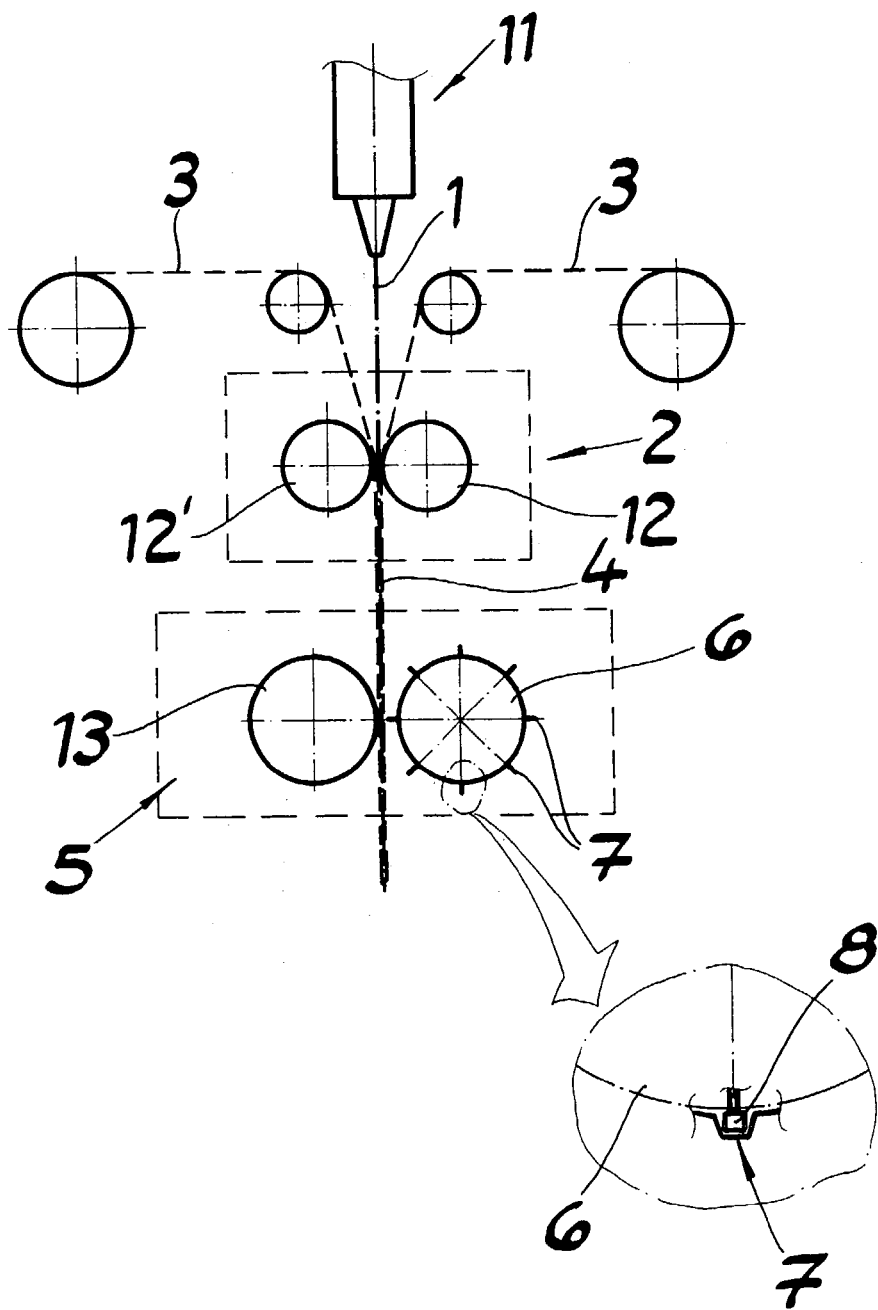
FIG. 1 is a process schematic of the method according to an embodiment of the invention.

The method illustrated in the drawings produces an elastic, air-permeable laminate film that has an elastomer intermediate layer and cover layers made of a fiber non-woven fabric.

In the method shown in FIG. 1, a melt film 1 produced from a thermoplastic elastomer, by means of extrusion, is passed to a laminating unit 2. Material webs 3 made of a fiber non-woven fabric, also run into laminating unit 2. There, melt film 1 in the thermoplasticized state comes between material webs 3. The melted intermediate layer of the multi-layered material is cooled to solidification temperature to form a laminate 4 with an elastomer intermediate layer and cover layers made of fiber non-woven fabric. Laminate 4 is subsequently passed to an ultrasound bonding station 5, in which the elastomer layer is melted or welded at discrete locations by means of ultrasound, to form spot welds or point-shaped bonds, while maintaining the substance of the fiber non-woven fabric. In this process, air-permeable structures are formed at the melted sites. A bonding roller 6, which has bonding spikes or thorns 7 that project from the circumference, is used to produce the point-shaped ultrasound bonds. Laminate 4 is passed over the circumferential surface of roller 6, whereby ultrasound vibrations are generated at the contact surfaces between bonding thorns 7 and laminate 4. For this purpose, bonding thorns 7 can be equipped with ultrasound heads 8. However, other types of devices with which point-shaped ultrasound bonds can be made in plastic films may be used.

Figure 2:
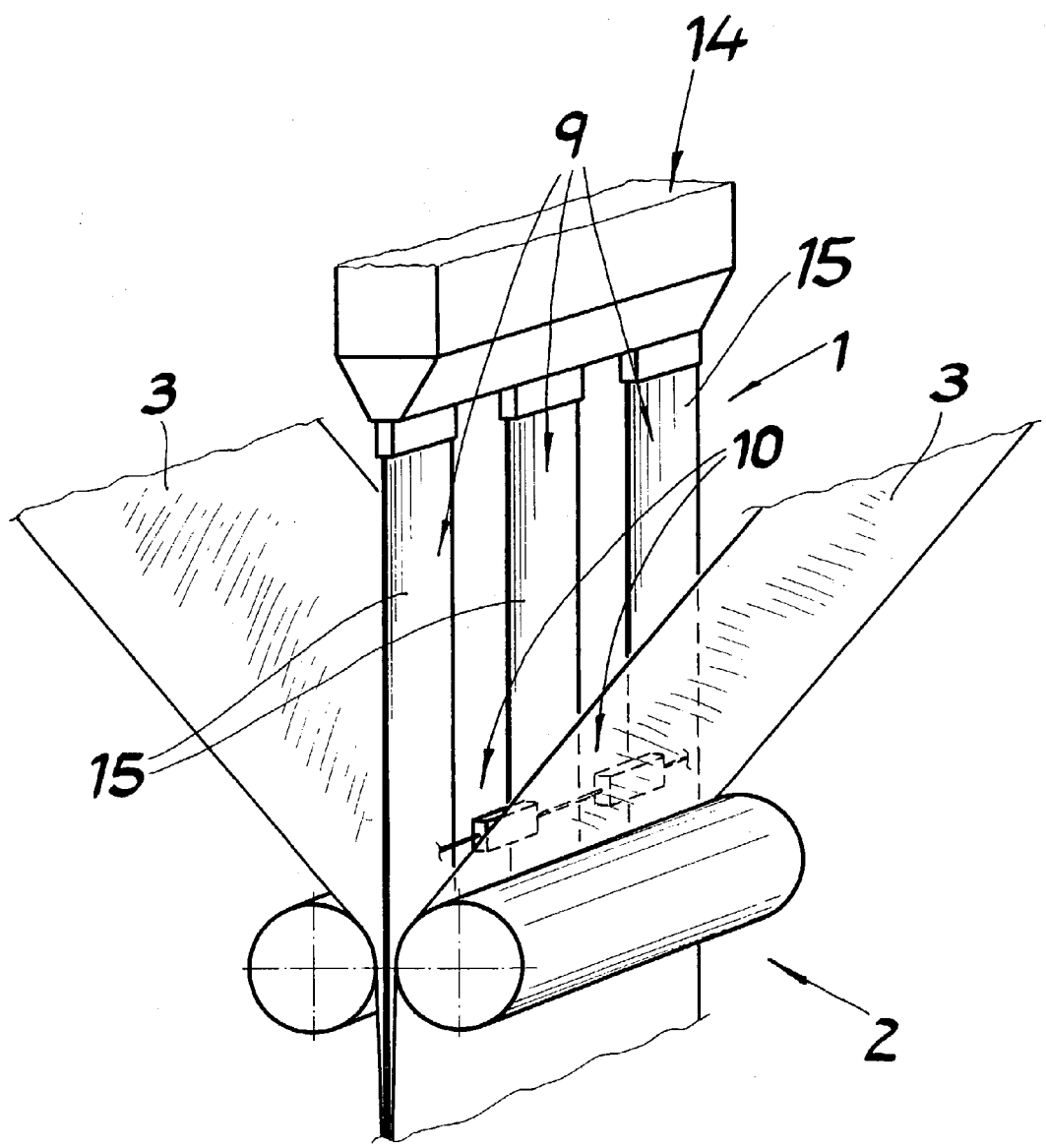
FIG. 2 is a process schematic of another embodiment of the method according to the invention.

In the embodiment shown in FIG. 2, the melt film 1 is passed to the laminating unit 2 in parallel strips 9 that are spaced apart from one another. Strips 9 are introduced between the material webs 3 made of fibrous non-woven fabric material. The non-woven fabric strips 3 are glued to one another in the regions 10 between the melt film strips. In this embodiment, material webs 3 are glued to one another over their entire surface. The adhesive is applied, in strips, to at least one of the two material webs 3, before the material webs run into laminating unit 2.

In the method shown in FIG. 1 and FIG. 2, a multi-layered melt film produced by means of co-extrusion can also be used as the melt film. The multi-layered co-extruded melt film is introduced between the material webs 3 that run into the laminating unit in the thermoplasticized state. Different materials can be used for the layers of the co-extruded film. At least one layer of the melt film is made of a thermoplastic elastomer.

In order to improve the elasticity of the material, the laminate films produced according to the invention can subsequently be stretched in the lengthwise direction and/or crosswise to the take-off direction, or subjected to incremental stretching. For the mechanical subsequent treatment, known devices, which are not shown here, can be used.

EXAMPLE 1

According to the process schematic shown in FIG. 1, a compound on the basis of styrene ethylene block copolymer (SEBS) with an addition of polyethylene copolymer is extruded on a broad-slit die extrusion system 11. The die width is 1,000 mm. The die gap is set to 0.7 mm. At a temperature of 200±5° C., the melt is extruded directly into the laminating unit 2, which has a cooled steel roller 12 and a rubber roller 12'. Two layers of polypropylene non-woven fabric are wound off and passed to laminating unit 2 as the outside material webs 3. The polymer melt flows between the two layers of the polypropylene fiber non-woven fabric and is cooled off to below the solidification temperature on steel cooling roller 12. The temperature of steel cooling roller 12 is 60° C. The laminating gap is set to 0.09 mm. Directly after leaving laminating unit 2, the laminate material is passed to the ultrasound bonding station 5 and passes through a bonding tool of rollers 6, 13 arranged in pairs. One roller 13 possesses a smooth circumferential surface, which serves as a counter-bearing. The other roller 6 is structured as a bonding roller with bonding spikes or thorns 7 projecting from the circumference, and represents the sonotrode of the tool. Using the ultrasound bonding tool, the laminate film consisting of two fiber non-woven fabric webs and an elastomer intermediate layer is melted or welded at points, whereby an air-permeable structure is formed. The adhesion between the laminate layers is also greater at the ultrasound-bonded sites than in the surrounding regions.

EXAMPLE 2

According to the system schematic shown in FIG. 2, a special extrusion die 14 is used, from which the melt film is passed to the laminating unit 2 in parallel strips 15 that are at a distance from one another, and introduced between the material webs 3 that consist of fiber non-woven fabric. Strips 15 consist of a thermoplastic elastomer, have a thickness, of approximately 100 μm, and are 50 mm wide. The distance between the strips is 100 mm, in each instance. A hot-melt glue on the basis of styrene isoprene styrene block copolymer (SIS) is sprayed onto one of the incoming polypropylene fiber non-woven fabrics 3. The width of the hot-melt strips is 105 mm at a distance of approximately 40 mm between the hot-melt strips. The hot-melt strips are positioned so that an adhesion between the two fiber non-woven fabric webs comes about in the regions 10, in which no elastomer strips are present. The laminate material produced is subsequently made air-permeable in the manner described above, by means of ultrasound bonding, and bonded at points. This results in an air-permeable laminate film with elastic strip inserts.

While only a few embodiments of the present invention have been shown and described, it is to be understood that many changes and modifications may be made thereunto without departing from the spirit and scope of the invention as defined in the appended claims.

What is claimed is:

1. A method for producing an elastic, air-permeable laminate film having an elastomeric intermediate layer disposed between outside cover layers made of non-woven material having a fine fiber structure, comprising the steps of:
    (a) passing a melt film made of a thermoplastic elastomer to a laminating unit and introducing the melt film in a thermoplasticized state between two webs of non-woven material running into the laminating unit to form a multi-layered material having the melt film as an intermediate layer;
    (b) cooling the intermediate layer to solidification temperature to produce a laminate having an elastomeric intermediate layer with cover layers made of non-woven material; and
    (c) subsequently passing the laminate to an ultrasound bonding station wherein the elastomeric intermediate layer is melted to form point bonds and air permeable structures in the elastomeric intermediate layer at discrete melt locations by means of ultrasound while maintaining the fine fiber structure of the non-woven material, the air-permeable structures formed by ultrasound at the melt locations being covered by the fine fiber structure of the cover layers.

2. The method according to claim 1, wherein the step of cooling the intermediate layer takes place at a cooled steel roller in a roller nip defined by two rollers.

3. The method according to claim 1, wherein in the ultrasound bonding station, the laminate is passed over a bonding roller having projecting circumferential bonding thorns and ultrasound vibrations are generated at contact surfaces between the bonding thorns and the laminate.

4. The method according to claim 1, wherein the melt film is a multi-layered co-extruded melt film having at least one layer made of a thermoplastic elastomer.

5. The method according to claim 1, wherein after the laminate leaves the ultrasound bonding station, the laminate is stretched in a lengthwise or crosswise direction or is subjected to incremental stretching.

6. A method for producing an elastic, air-permeable laminate film having an elastomeric intermediate layer disposed between outside cover layers made of non-woven material having a fine fiber structure, comprising the steps of:
    (a) passing a melt film made of a thermoplastic elastomer to a laminating unit and introducing the melt film in a thermoplasticized state between two webs of non-woven material running into the laminating unit to form a multi-layered material having the melt film as an intermediate layer;
    (b) cooling the intermediate layer to solidification temperature to produce a laminate having an elastomeric intermediate layer with cover layers made of non-woven material; and
    (c) subsequently passing the laminate to an ultrasound bonding station wherein the elastomeric intermediate layer is melted to form point bonds and air permeable structures in the elastomeric intermediate layer at discrete melt locations by means of ultrasound while maintaining the fine fiber structure of the non-woven material, the air-permeable structures formed by ultrasound at the melt locations being covered by the fine fiber structure of the cover layers,
    wherein the melt film is passed to the laminating unit in spaced-apart parallel melt film strips and introduced between the webs of non-woven material and wherein the webs of non-woven material are glued to one another.

7. The method according to claim 6, further comprising the step of applying adhesive in strips to a surface of at least one of the two non-woven material webs before the material webs run into the laminating unit and wherein the non-woven material webs are glued together over the entire regions between the melt film strips.

8. The method according to claim 6, wherein the step of cooling the intermediate layer takes place at a cooled steel roller in a roller nip defined by two rollers.

9. The method according to claim 6, wherein in the ultrasound bonding station, the laminate is passed over a bonding roller having projecting circumferential bonding thorns and ultrasound vibrations are generated at contact surfaces between the bonding thorns and the laminate.

10. The method according to claim 6, wherein the melt film is a multi-layered co-extruded melt film having at least one layer made of a thermoplastic elastomer.

11. The method according to claim 6, wherein after the laminate leaves the ultrasound bonding station, the laminate is stretched in a lengthwise or crosswise direction or is subjected to incremental stretching.

* * * * *